United States Patent
McHale et al.

(10) Patent No.: US 6,278,728 B1
(45) Date of Patent: Aug. 21, 2001

(54) REMOTE XDSL TRANSCEIVER UNIT AND METHOD OF OPERATION

(75) Inventors: John F. McHale; Robert H. Locklear, Jr., both of Austin; James R. Sisk, Cedar Park; Craig Cantrell, Austin; Kip McClanahan, Austin; Jonathan Harrod, Austin, all of TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/040,884

(22) Filed: Mar. 18, 1998

(51) Int. Cl.[7] .................................................. H04B 1/38

(52) U.S. Cl. ............................................ 375/219; 375/377

(58) Field of Search ................................... 375/219, 220, 375/222, 257, 377

(56) References Cited

U.S. PATENT DOCUMENTS

| | | | |
|---|---|---|---|
| 3,532,827 | 10/1970 | Ewin | 179/18 |
| 3,821,484 | 6/1974 | Sternung et al. | 179/18 EB |
| 4,002,849 | 1/1977 | Kotler et al. | 179/18 EB |
| 4,282,408 | 8/1981 | Stauers | 179/18 FA |
| 4,438,511 | 3/1984 | Baran | 370/19 |
| 4,665,514 | 5/1987 | Ching et al. | 370/60 |
| 4,679,227 | 7/1987 | Hughes-Hartogs | 379/98 |
| 4,731,816 | 3/1988 | Hughes-Hartogs | 379/98 |
| 4,757,495 | 7/1988 | Decker et al. | 370/76 |
| 4,782,512 | 11/1988 | Hutton | 379/98 |
| 4,833,706 | 5/1989 | Hughes-Hartogs | 379/98 |
| 4,839,892 * | 6/1989 | Sasaki | 370/348 |
| 4,841,561 | 6/1989 | Hill | 379/97 |
| 4,949,355 | 8/1990 | Dyke et al. | 375/10 |
| 4,975,906 | 12/1990 | Takiyasu et al. | 370/85.13 |
| 4,980,897 | 12/1990 | Decker et al. | 375/38 |
| 4,985,889 | 1/1991 | Frankish et al. | 370/94.1 |
| 5,025,469 | 6/1991 | Bingham | 379/98 |
| 5,054,034 | 10/1991 | Hughes-Hartogs | 375/8 |
| 5,119,402 | 6/1992 | Ginzburg et al. | 375/17 |
| 5,119,403 | 6/1992 | Krishnan | 375/39 |
| 5,134,611 | 7/1992 | Steinka et al. | 370/79 |

(List continued on next page.)

FOREIGN PATENT DOCUMENTS

| | | | |
|---|---|---|---|
| 0677941A2 | 2/1995 | (EP) | H04L/12/56 |
| 6376648 | 4/1988 | (JP) | H04L/11/20 |
| WO8602796 | 9/1986 | (WO) | H04M/3/30 |
| WO9520282 | 7/1995 | (WO) | H04L/12/46 |
| WO9604729 | 2/1996 | (WO) | H04J/5/00 |
| WO 97/37458 | 10/1997 | (WO) . | |

OTHER PUBLICATIONS

H. Hessenmuller et al., Access Network Structure for Interactive Video Services, Pt. I, 8/94.

H. Hessenmuller et al., Access Network Structure for Interactive Video Services, Pt. 2, 9/94.

*Primary Examiner*—Young T. Tse
(74) *Attorney, Agent, or Firm*—Baker Botts L.L.P.

(57) ABSTRACT

A remote XDSL transceiver unit (16) includes an XDSL transceiver (19) and a control block (18). The XDSL transceiver (19) is operable to establish and communicate across an XDSL physical layer. The control block (18) is coupled to the XDSL transceiver (19) and operates to transmit a request for service to a loop termination point. The control block (18) also operates to identify a signal received from the loop termination point (14) and respond based upon a current context of the remote XDSL transceiver unit (16). Further, the control block (18) operates to control power-up and training of the XDSL transceiver (19) such that the XDSL physical layer can be dynamically brought up and down. In one embodiment, the control block (18) operates to store profile information for an established XDSL physical layer to use for future re-establishing of the XDSL physical layer.

9 Claims, 3 Drawing Sheets

U.S. PATENT DOCUMENTS

| | | | |
|---|---|---|---|
| 5,185,763 | 2/1993 | Krishnan | 375/39 |
| 5,198,818 | 3/1993 | Samueli et al. | 341/144 |
| 5,199,071 | 3/1993 | Abe et al. | 379/98 |
| 5,202,884 | 4/1993 | Close et al. | 370/94.1 |
| 5,206,886 | 4/1993 | Bingham | 375/97 |
| 5,210,530 | 5/1993 | Kammerer et al. | 340/825.08 |
| 5,214,650 | 5/1993 | Renner et al. | 370/110.1 |
| 5,222,077 | 6/1993 | Krishnan | 375/39 |
| 5,228,062 | 7/1993 | Bingham | 375/97 |
| 5,247,347 | 9/1993 | Litteral et al. | 358/85 |
| 5,282,155 | 1/1994 | Jones | 364/724.19 |
| 5,285,474 | 2/1994 | Chow et al. | 375/13 |
| 5,293,402 | 3/1994 | Crespo et al. | 375/14 |
| 5,295,159 | 3/1994 | Kerpez | 375/38 |
| 5,331,670 | 7/1994 | Sorbara et al. | 375/111 |
| 5,337,348 | 8/1994 | Yamazaki et al. | 379/94 |
| 5,339,355 | 8/1994 | Mori et al. | 379/94 |
| 5,341,474 | 8/1994 | Gelman et al. | 395/200 |
| 5,345,437 | 9/1994 | Ogawa | 370/13 |
| 5,367,540 | 11/1994 | Kakuishi et al. | 375/103 |
| 5,371,532 | 12/1994 | Gelman et al. | 348/7 |
| 5,379,441 | 1/1995 | Watanabe et al. | 395/800 |
| 5,390,239 | 2/1995 | Morris et al. | 379/93 |
| 5,400,322 | 3/1995 | Hunt et al. | 370/19 |
| 5,404,388 | 4/1995 | Eu | 379/24 |
| 5,408,260 | 4/1995 | Arnon | 348/6 |
| 5,408,522 | 4/1995 | Ikehata et al. | 379/98 |
| 5,408,527 | 4/1995 | Tsutsu | 379/211 |
| 5,408,614 | 4/1995 | Thornton et al. | 395/275 |
| 5,410,264 | 4/1995 | Lechleider | 327/311 |
| 5,410,343 | 4/1995 | Coddington et al. | 348/7 |
| 5,412,660 | 5/1995 | Chen et al. | 370/110.1 |
| 5,414,455 | 5/1995 | Hooper et al. | 348/7 |
| 5,414,733 | 5/1995 | Turner | 375/233 |
| 5,422,876 | 6/1995 | Turudic | 370/15 |
| 5,428,608 | 6/1995 | Freeman et al. | 370/60.1 |
| 5,430,793 | 7/1995 | Ueltzen et al. | 379/98 |
| 5,434,863 | 7/1995 | Onishi et al. | 370/85.13 |
| 5,440,335 | 8/1995 | Beveridge | 348/13 |
| 5,442,390 | 8/1995 | Hooper et al. | 348/7 |
| 5,444,703 | 8/1995 | Gagliardi et al. | 370/60.1 |
| 5,452,306 | 9/1995 | Turudic et al. | 370/110.1 |
| 5,453,779 | 9/1995 | Dan et al. | 348/7 |
| 5,461,415 | 10/1995 | Wolf et al. | 348/7 |
| 5,461,616 | 10/1995 | Suzuki | 370/79 |
| 5,461,624 | 10/1995 | Mazzola | 370/85.13 |
| 5,461,640 | 10/1995 | Gatherer | 375/231 |
| 5,469,495 | 11/1995 | Beveridge | 379/56 |
| 5,473,599 | 12/1995 | Li et al. | 370/16 |
| 5,475,735 | 12/1995 | Williams et al. | 379/59 |
| 5,477,263 | 12/1995 | O'Callaghan et al. | 348/7 |
| 5,479,447 | 12/1995 | Chow et al. | 375/260 |
| 5,495,483 | 2/1996 | Grube et al. | 370/95.1 |
| 5,504,736 | 4/1996 | Cubbison, Jr. | 370/13 |
| 5,504,753 | 4/1996 | Renger et al. | 371/20.1 |
| 5,506,868 | 4/1996 | Cox et al. | 375/222 |
| 5,513,251 | 4/1996 | Rochkind et al. | 379/93 |
| 5,517,488 | 5/1996 | Miyazaki et al. | 370/16 |
| 5,528,585 | 6/1996 | Cooley et al. | 370/56 |
| 5,546,379 | 8/1996 | Thaweethai et al. | 370/17 |
| 5,555,244 | 9/1996 | Gupta et al. | 370/60.1 |
| 5,574,724 | 11/1996 | Bales et al. | 370/68.1 |
| 5,583,862 | 12/1996 | Callon | 370/397 |
| 5,583,872 | 12/1996 | Albrecht et al. | 370/476 |
| 5,598,406 | 1/1997 | Albrecht et al. | 370/296 |
| 5,600,712 | 2/1997 | Hanson | 379/142 |
| 5,602,902 | 2/1997 | Satterlund et al. | 379/59 |
| 5,604,741 | 2/1997 | Samueli et al. | 370/402 |
| 5,612,957 | 3/1997 | Gregerson et al. | 370/401 |
| 5,621,731 | * 4/1997 | Dale et al. | 370/257 |
| 5,631,897 | 5/1997 | Pacheco et al. | 370/237 |
| 5,649,001 | 7/1997 | Thomas et al. | 379/93.07 |
| 5,668,857 | 9/1997 | McHale | 379/93.07 |
| 5,678,004 | 10/1997 | Thaweethai | 595/187.01 |
| 5,687,176 | 11/1997 | Wisniewski et al. | 370/476 |
| 5,737,364 | 4/1998 | Cohen et al. | 375/220 |
| 5,756,280 | 5/1998 | Soora et al. | 455/4.2 |
| 5,770,950 | 6/1998 | Zurcher et al. | 326/30 |
| 5,781,617 | 7/1998 | McHale et al. | 379/93.14 |
| 5,799,017 | 8/1998 | Gupta et al. | 370/419 |
| 5,812,786 | 9/1998 | Seazholtz et al. | 395/200.63 |
| 5,852,655 | 12/1998 | McHale et al. | 379/93.14 |
| 5,905,781 | * 5/1999 | McHale et al. | 379/93.14 |
| 5,999,540 | * 12/1999 | McGhee | 370/465 |
| 6,084,881 | * 7/2000 | Fosmark et al. | 370/397 |

\* cited by examiner

REMOTE XDSL TRANSCEIVER UNIT AND METHOD OF OPERATION

TECHNICAL FIELD OF THE INVENTION

This invention relates in general to digital subscriber line (XDSL) communication systems, and more particularly to a remote XDSL transceiver unit and method of operation.

BACKGROUND OF THE INVENTION

Conventional XDSL transceiver units (xTU's) are located remotely as customer premises equipment (CPE) as well as being located at the loop termination point (e.g., central office, remote terminal). Conventional XDSL transceiver units typically turn on the XDSL transceiver and train the XDSL physical layer connection at power up of the unit. This conventional operation is appropriate for conventional XDSL communication schemes in which each subscriber has a dedicated XDSL transceiver unit at the loop termination point.

SUMMARY OF THE INVENTION

In accordance with the present invention, a remote XDSL transceiver unit having digital off-hook control and a method of operation are disclosed that provide advantages over conventional remote XDSL transceiver units.

According to one aspect of the present invention, the remote XDSL transceiver unit includes an XDSL transceiver and a control block. The XDSL transceiver is operable to establish and communicate across an XDSL physical layer. The control block is coupled to the XDSL transceiver and operates to initiate a request for service to a loop termination point. The control block also operates to control power-up and training of the XDSL transceiver such that the XDSL physical layer can be dynamically brought up and down. In one embodiment, the control block operates to store profile information for an established XDSL physical layer to use for future re-establishment of the XDSL physical layer.

According to another aspect of the present invention, a method is provided for operating a remote XDSL transceiver unit. A first state is provided corresponding to a digital on-hook condition. A second state is provided corresponding to a pending request for service to a loop termination point, and a third state is provided corresponding to a digital off-hook condition. The method includes responding to a busy signal, when in the second state, by moving to the first state. Further, the method includes responding to a grant signal, when in the second state, by moving to the third state. The method also includes training and establishing an XDSL physical layer after moving to the third state. As mentioned above, in one embodiment profile information from the XDSL physical layer can be stored for later use.

A technical advantage of the present invention is the provision of a remote XDSL transceiver unit that has the ability to control transmission and training of the XDSL physical layer. The XDSL physical layer can be dynamically brought up and down based upon data traffic or other conditions.

Another technical advantage of the present invention is the storing of profile information defining the XDSL physical layer after training so that the XDSL physical layer can be quickly brought back up after having been dropped. The XDSL transceiver unit can include an XDSL chipset and a number of registers associated with the XDSL chipset. A control block coupled to the XDSL chipset and the registers can receive profile information and store the profile information in preparation for XDSL communication. The profile information may specify filter coefficients, equalizer tap values, sub-band weighting, data rates, margins, and other information that reflects electrical and/or physical parameters of the twisted pair lines. In a particular embodiment, the XDSL transceiver unit performs a training session at a variety of bands and rates to generate profile information. The profile information can be stored in an appropriate non-volatile memory. The XDSL transceiver unit retrieves the stored profile information to engage in XDSL communication without a protracted training period. The XDSL transceiver unit may also perform a full or partial retraining of the line as needed. The profile information may include, for example, digital filter coefficients used in carrier-less amplitude phase (CAP) modulation, discrete multi-tone (DMT) modulation, or other suitable modulation.

An additional technical advantage of the present invention is the ability to communicate and exchange information between the loop termination point and the customer premises equipment regarding the intent to take down the physical layer to insure that the physical layer is dropped only with the consent of both end points. This can be important for the ability to allow a data link to remain open while the physical link is dropped and restored.

Other technical advantages of the present invention should be apparent from the drawings, description and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
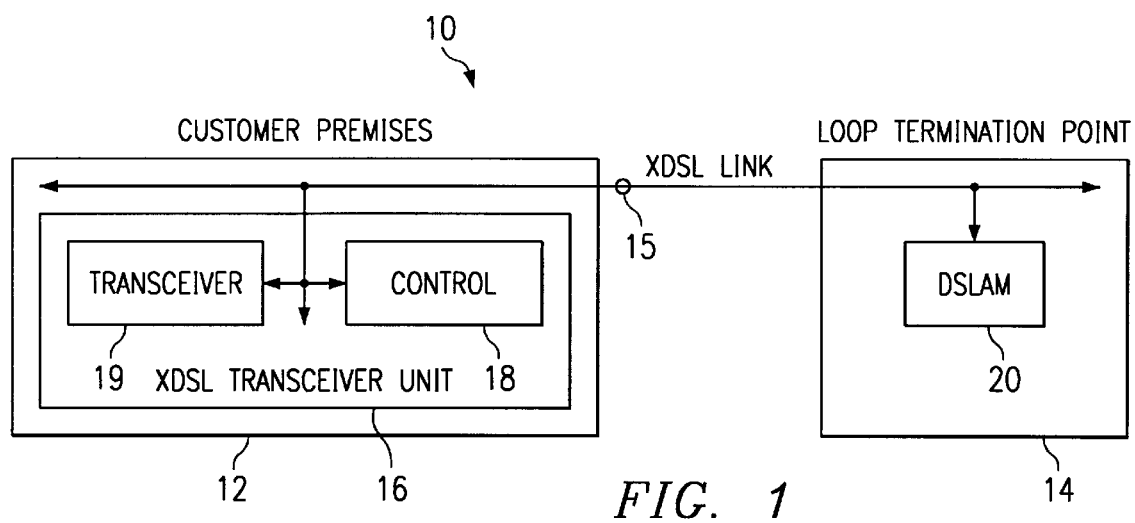
FIG. 1 is a block diagram of one embodiment of an XDSL link between a customer premises and a loop termination point according to the present invention.

FIG. 1 is a block diagram of one embodiment of an XDSL communication system, indicated generally at 10, providing an XDSL link between a customer premises 12 and a loop termination point 14. Customer premises 12 can include a residence, business or other remote termination point of the XDSL physical layer. Loop termination point 14 can include a central office, remote terminal or other network termination point for an XDSL physical layer 15. One XDSL communication system including a communication server is disclosed and described in U.S. Pat. No. 5,668,857 (Ser. No. 08/625,769), entitled "Communication Server Apparatus and Method."

In the embodiment of FIG. 1, customer premises 12 includes a remote XDSL transceiver unit 16. According to the present invention, XDSL transceiver unit 16 includes a control block 18 coupled to the XDSL transceiver 19. Control block 18 provides important features for XDSL transceiver unit 16 and allows the XDSL physical layer to be dynamically controlled from the remote end point as well as providing other technical advantages. As shown, loop termination point 14 can include a digital subscriber line access multiplexer (DSLAM) 20 that provides the network termination point for the XDSL physical layer. Conventional operation of XDSL transceiver unit 16 and access multiplexer 20 are well known. One particular embodiment of an access multiplexer is disclosed and described in U.S. Pat. No. 5,668,857. In that embodiment, access multiplexer 20 allows oversubscription of the XDSL transceiver units in access multiplexer 20. The access multiplexer 20 then uses requests for service from remote XDSL transceiver units to initiate assignment of XDSL transceiver units to requesting customers.

Returning to FIG. 1, according to the present invention, control block 18 provides the ability for XDSL transceiver unit 16 to dynamically control XDSL transceiver 19 and the XDSL physical layer. In contrast, conventional XDSL transceiver units located at the customer premises 12 would typically turn on the XDSL transceiver and train the XDSL physical layer at power up of the XDSL transceiver unit 16. This is appropriate for an arrangement in which customer premises 12 has a dedicated XDSL transceiver unit allocated within access multiplexer 20. However, in a scheme where there is oversubscription of XDSL transceiver units, a dedicated XDSL link between customer premises 12 and loop termination point 14 is not desirable. Consequently, according to the present invention, control block 18 enables XDSL transceiver unit 16 to provide control of establishing and training the XDSL physical layer. Further, control block 18 can control the XDSL physical layer being brought up and down based upon data traffic or other conditions. Control block 18 can communicate and exchange information with access multiplexer 20 regarding the intent to take down the physical layer due to a lack of data traffic or certain other conditions. This exchange of information insures that the deactivation of the physical layer occurs with the consent of both access multiplexer 20 and XDSL transceiver unit 16. This prevents the XDSL physical layer from being dropped without the consent of both end points.

According to the present invention, control block 18 can store profile information determined after training and establishing the XDSL physical layer. This profile information can then be used in quickly bringing back the XDSL physical layer back after termination. For example, after the physical layer has been brought down due to low data traffic, it can be quickly brought back up by loading the profile information from storage. Typically, XDSL transceiver unit 16 can include an XDSL chipset used to implement transceiver 19 and can include a number of registers associated with the XDSL chipset. Control block 18 can include a microcontroller coupled to the XDSL chipset that receives profile information and stores the profile information in the registers in preparation for XDSL communication. The profile information may specify filter coefficients, equalizer tap values, sub-band weighting, data rates, margins, and other information that reflects electrical and/or physical parameters of the twisted pair lines. In a particular embodiment, the XDSL transceiver unit 16 performs a training session at a variety of bands and rates to generate profile information. The profile information is stored in an appropriate non-volatile memory. The XDSL transceiver unit 16 receives the stored profile information to engage in XDSL communication 5 without a protracted training period. The XDSL transceiver unit 16 may also perform a full or partial retraining of the line as needed. The profile information may include, for example, digital filter coefficients used in carrier-less amplitude phase (CAP) modulation, discrete multi-tone (DMT) modulation, or other suitable modulation.

Figure 2:
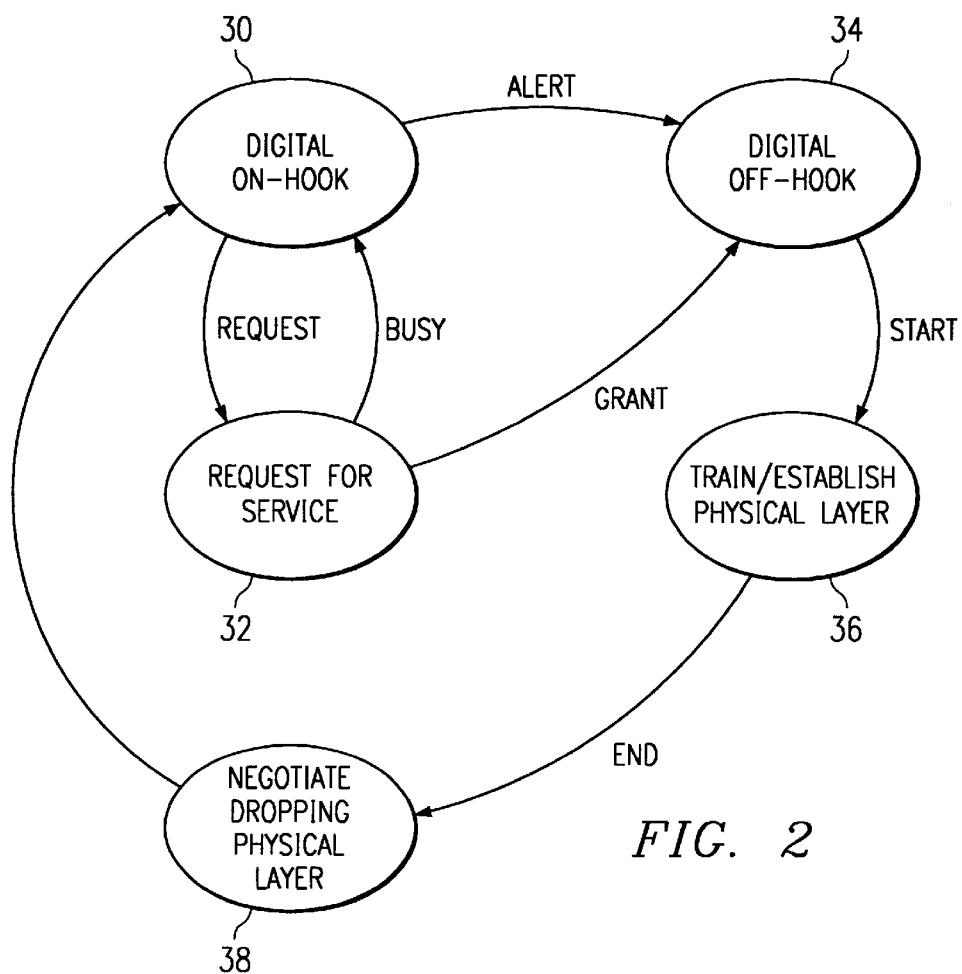
FIG. 2 is a state diagram of one embodiment of a method of operation of a remote XDSL transceiver unit according to the present invention.

FIG. 2 is a state diagram of one embodiment of a method of operation of a remote XDSL transceiver unit according to the present invention. As shown, the remote XDSL transceiver unit can initially be in a digital on-hook condition in a first state 30. In state 30, the control block can allow the remote XDSL transceiver unit to respond to an alert signal from the loop termination point. The alert signal can, for example, be an in-band 300 kHz sine tone transmitted by the loop termination point equipment. According to the present invention, the remote XDSL transceiver unit's response to the signal can be context sensitive. After a request by the remote XDSL transceiver unit to the loop termination point for data service, the remote XDSL transceiver unit interprets the signal as a busy indication that there are no XDSL transceiver units available at the loop termination point. On the other hand, if the remote XDSL transceiver unit is not transmitting (i.e., in an on-hook condition), the remote XDSL transceiver unit can interpret the signal as an alert indication that a data transmission is available. The control block can then respond by enabling the remote XDSL transceiver and responding to the train sequence from the loop termination point equipment.

As shown in FIG. 2, when in state 30, the control block can initiate a request for digital service to the loop termination point. After such a request, the remote XDSL transceiver unit moves to a second state 32 corresponding to the pending request for service. When in state 32, the remote XDSL transceiver unit can receive a busy signal response from the loop termination point. If a busy signal is received, the control block identifies the busy signal and returns the remote XDSL transceiver unit to the digital on-hook state 30. When in state 32, the remote XDSL transceiver unit alternately may receive a grant signal from the loop termination point. If so, the control block responds to the grant of the request for service by moving to a third state 34 which represents a digital off-hook condition. As shown, the remote XDSL transceiver unit can also move directly from state 30 to state 34 in response to an alert signal from the loop termination point.

When in state 34, the remote XDSL transceiver unit can initiate a XDSL physical communication layer by moving to state 36 in which the physical layer is trained and established. After the physical layer is established, the control block can store the resulting profile information for later use in re-establishing the physical layer. The remote XDSL transceiver unit remains in state 36 until the physical layer needs to be brought down, for example due to low data traffic or other conditions. When the physical layer is going to be brought down, the transceiver unit moves to state 38 in which dropping of the physical layer is negotiated between the remote XDSL transceiver unit and the loop termination point. However, if the transceiver unit desires to disconnect, then negotiation is not necessarily needed. After the negotiation has been completed, the physical layer can be dropped (even without dropping the data layer), and the remote XDSL transceiver unit can return to the digital on-hook condition of state 30.

According to the present invention, when the remote XDSL transceiver unit again wants to train and establish a physical layer, the stored profile information can be used as a starting point to more quickly return the XDSL physical layer to operation. This can be particularly beneficial in a situation where it is desired to manage connections between customer premises equipment and an access multiplexer to dynamically bring up and bring down physical layers to better utilize oversubscribed resources at the loop termination point.

The following TABLE illustrates in more detail an exemplary embodiment of a variety of profile information.

TABLE 1

| MAXIMUM RATE (UP/DOWN) | MARGIN (UP/DOWN) | COEFFICIENTS/ PARAMETERS |
|---|---|---|
| 1 Mbps | 32 dB | Coefficient/ |
| 4 Mbps | 30 dB | parameter data |

This profile information can involve a variety of digital signal processor (DSP) filter coefficients, parameters, configuration, and line training parameters used by XDSL modems or transceiver units to establish an XDSL communication session. Generally, the profile information shown in TABLE 1 includes maximum rates, margins, and a variety of coefficients/parameters. Maximum rates specify both upstream and downstream maximum baud rates for the identified line. Maximum rates may be based on the tariffed rate for the subscriber, physical limitations on the line, or other factors. For example, the line maintains a maximum upstream rate of one megabit per second (1 Mbps) and a maximum downstream rate of 4 Mbps based, for example, on a particular class of service for the subscriber. Alternatively, the line may have a maximum rate as obtainable by the hardware and software.

The margin represents the difference between a current or expected signal strength and a minimum signal strength to maintain communication at the specified maximum rate over the designated line. In a particular embodiment, margin is the difference between the achievable or current signal-to-noise ratio and the minimum signal-to-noise ratio to maintain communication for a given bit error rate (BER) such as 10E-7. Margin may be expressed in dB and generally represents the quality of data communication on the line at maximum rates.

Coefficients/parameters comprise digital filter coefficients, equalizer tap coefficients, sub-band weights, quadrature amplitude modulation (QAM) constellation configuration, bit capacity, or other coefficients and/or parameters that reflect physical and/or electrical characteristics of the line. The profile information maintains coefficients/parameters for each band (e.g., upstream, downstream, sub-band) for each line at one or more selected rates.

In a particular embodiment, the XDSL transceiver unit includes one or more chipsets that have registers for receiving profile information in preparation for XDSL communication. The registers may be associated with digital filters implemented by DSPs in the chipset. Using CAP, DMT, or other appropriate modulation technique, the profile information characterizes or fashions the XDSL unit for communication over a particular line.

The maintenance of profile information provides a particular advantage in training lines and quickly establishing XDSL sessions. Each line includes a number of physical parameters, such as length, gauge, bridge taps, or other impairments or characteristics that govern the transmission of electric signals along the line. In addition, adjacent wires may contribute to interference on the line. Many of these characteristics and parameters are static as the physical structure of the line remains unchanged. The present invention takes advantage of this by initially training the line to generate profile information for storage. The profile information can then be retrieved and provided to the XDSL transceiver unit in preparation for XDSL communication. The use of stored profile information significantly decreases the amount of time needed to establish XDSL communication, and may substantially reduce or eliminate any need for retraining the line. By storing and selectively loading profile information, the present invention eliminates or hastens convergence of various adaptive elements (e.g., equalizers, filters) to improve access and performance.

Figure 3:
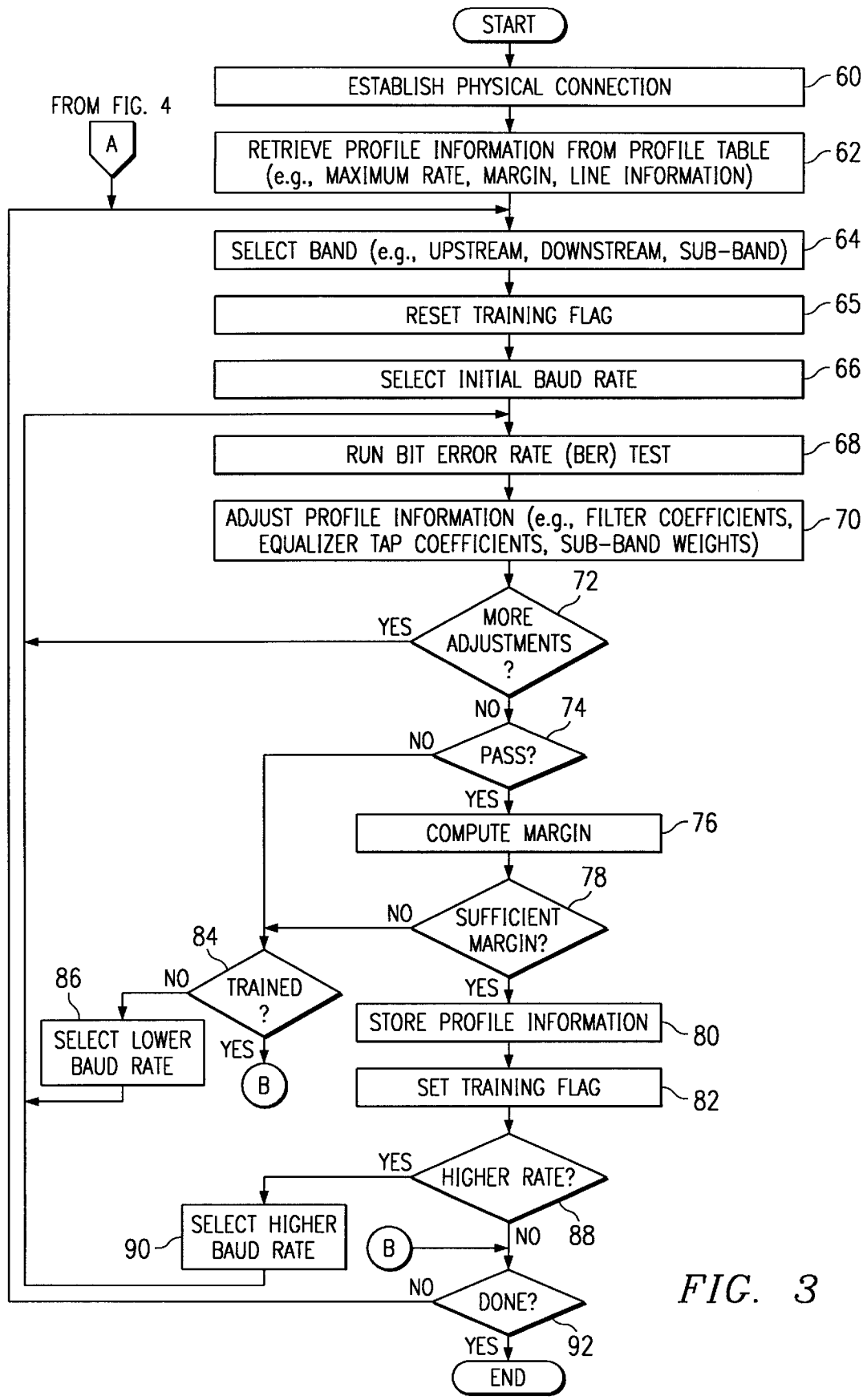
FIG. 3 is a flowchart of a method for training a line according to the present invention.

FIG. 3 is a flowchart of a method for training a line to generate or modify the profile information. The method begins at step 60 where the XDSL transceiver unit establishes a physical connection with an associated line. The XDSL transceiver unit retrieves profile information from a profile table associated with the line at step 62. This may be performed by a microcontroller in the transceiver unit. In step 64, the transceiver unit selects a band for training, which could include the upstream, downstream, or sub-band supported by the particular modulation technique used. For example, using CAP modulation, the transceiver unit may select an upstream or a downstream band to train. Using DMT modulation, the transceiver unit may select a discrete sub-band used by the DMT modulation technique. Alternatively, the transceiver unit may train two or more bands simultaneously. After selecting a band at step 64, the method can reset a training flag at step 65 to indicate that the selected band of the selected line has not been trained.

To begin a training session, the transceiver unit can select an initial baud rate at step 66, which may be included in or derived from the profile information (e.g., the maximum rates) or generated locally. The transceiver unit then runs a test to determine the quality or characteristics of the line at step 68. This test may be a measure of signal strength and/or noise to determine a line margin, a bit error rate (BER) test, or any other measurement or method to determine the quality or characteristics of the line. In a particular embodiment, a BER test sends and receives known information on the line using the chipset. The transceiver unit can adjust profile information in response to the test at step 70 to improve signal quality. For example, the transceiver unit may adjust filter coefficients, equalizer tap coefficients, sub-band weights, QAM constellation configurations, bit rate, or any other coefficient or parameter that enables the chipset to communicate data more effectively over the line. If more adjustments need to be made as determined at step 72, the transceiver unit continues to run tests (step 68) and adjust the profile information (step 70) until achieving satisfactory performance from the chipset. In particular, the transceiver unit may make adjustments until it achieves a bit error rate of less than a particular threshold, such as 10E-7.

After making adjustments, the transceiver unit determines if it passed the training session at step 74.

Again, this pass/fail determination may be based on the computed bit error rate being above or below a pre-defined threshold. Upon passing, the transceiver unit can compute the margin at step 76. The margin may be expressed in dB and represents the difference between a current or expected signal strength and a minimum signal strength to maintain communication at the selected baud rate (step 66) in one or more selected bands (step 64). If the transceiver unit determines that the margin is sufficient at step 78, then the profile information can be stored in the profile table. The method can then set the training flag at step 82 to indicate successful training of one or more selected bands of the line.

If the transceiver unit does not pass the training session (step 74) or does not achieve sufficient margin 56 (step 78), then the transceiver unit determines if it has previously trained successfully at this band by checking the status of the training flag at step 84. If the training flag indicates successful training at step 84, the transceiver unit proceeds if necessary to select another band for training at step 64. If the training flag indicates no successful training at step 84, the transceiver unit selects a lower baud rate at step 86 and proceeds with another training session at the lower baud rate at step 68.

Upon storing the profile information at step 80 and setting the training flag at step 82, the transceiver unit may determine at step 88 to attempt training at a higher rate as selected at step 90. Training at a higher rate may depend upon the maximum rate or other subscriber information that limits the maximum data rate for a particular line. Also, the selection of a higher baud rate at step 90 may depend on the margin computed at step 76. In a particular embodiment, a large margin may cause the transceiver unit to skip an interim baud rate and select a higher baud rate at step 90 to further decrease training time. Upon selecting a higher baud rate, the transceiver unit proceeds with a training session at the higher baud rate at step 68.

If the transceiver unit cannot or does not select a higher baud rate for training at step 88, the method determines if all bands have been trained at step 92 and, if not, continues with step 64 to select the next band for training. The method ends after all bands for the line are trained and all associated profile information for each band stored.

Figure 4:
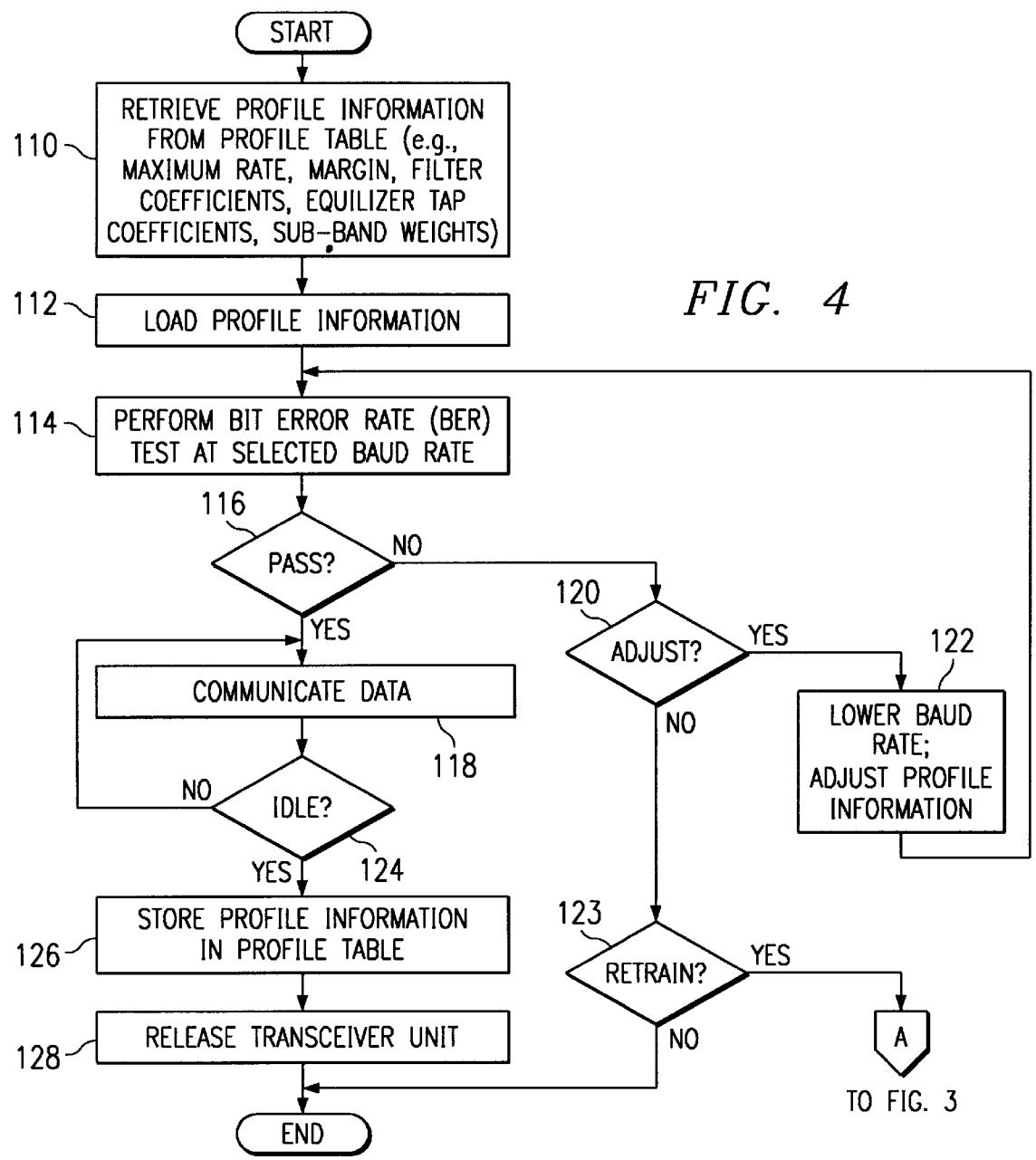
FIG. 4 is a flowchart of a method for retrieving profile information in preparation for XDSL communication according to the present invention.

FIG. 4 is a flow chart of a method for establishing data communication using stored profile information. The method begins at step 110 after the transceiver unit has received a response to a request for service and desires to establish the XDSL link. In step 110, the transceiver unit retrieves the profile information from the profile table. As described above with reference to TABLE 1, this information may include maximum rate, margin, or any variety of coefficients/parameters (e.g., filter coefficients, equalizer tab coefficients, sub-band weights), or other suitable information that characterizes the line and the appropriate communication parameters for the transceiver unit.

Upon receiving the profile information, the transceiver unit loads this information at step 112. In a particular embodiment, a microcontroller passes the profile information to registers associated with a digital signal processor in the chipset. Upon receiving and loading the profile information from the profile table, the transceiver unit prepares to communicate data using the maximum rate, margin 56, and coefficients/parameters specific to the line.

In a particular embodiment, the transceiver unit performs a test at a selected baud rate to confirm the quality of the line and the accuracy or effectiveness of the profile information retrieved from the profile table at step 114. This test may be a measure of signal strength and/or noise to determine a line margin, a bit error rate (BER) test, or any other measurement or method to determine the quality or characteristics of the line. If the transceiver unit passes the test as determined at step 116, then the transceiver unit proceeds to communicate data associated with the session at step 118. If the transceiver unit does not pass the test as determined at step 116, then the method determines whether the baud rate and/or the profile information should be adjusted at step 120. If the baud rate and/or the profile information are to be adjusted, the transceiver unit proceeds to lower the baud rate and/or adjust the profile information at step 122 in preparation for another test. For example, the transceiver unit may simply lower the baud rate at step 122 and perform a confirming test at step 114 without a significant sacrifice in time to train the line.

The transceiver unit may also make adjustments in the profile information, with or without a baud rate adjustment, to retrain the line.

If the baud rate and/or profile information should not or cannot be adjusted at step 120, then the method determines whether full retraining of the line is appropriate at step 123. If full retraining is appropriate, the method proceeds to step 64 in FIG. 3 to perform retraining to update and modify the profile information maintained in the profile table. Retraining of the line may be performed at periodic intervals or when physical or electrical characteristics of the line indicate a need for retraining.

After communicating data at step 118, the method can determine if the transceiver unit has been idle for a predetermined period of time at step 124. If the transceiver unit has been idle, the profile information can be retrieved from the registers and stored in the profile table at step 126. It can be important that the transceiver unit retrieve modified or updated profile information from the registers to maintain the most recent information for the line in the profile table. In step 128, either due to an idle period or the end of a session, the transceiver unit is released.

Although the invention has been described in detail, it should be understood that various changes, substitutions and alterations can be made thereto without departing from the spirit and scope of the invention as defined by the appended claims.

What is claimed is:

1. A digital subscriber line (XDSL) transceiver unit, the XDSL transceiver unit located remotely from a loop termination point and comprising:

an XDSL transceiver operable to establish and communicate across an XDSL physical layer; and a control block coupled to the XDSL transceiver, the control block operable:

to transmit a request for service to a loop termination point;

to identify a signal received from the loop termination point and respond based upon a current context of the remote XDSL transceiver unit; and to control power-up and training of the XDSL transceiver such that the XDSL physical layer can be dynamically brought up and down.

2. The XDSL transceiver unit of claim 1, wherein the control block is further operable to store profile information for an established XDSL physical layer to use for future re-establishment of the XDSL physical layer.

3. The XDSL transceiver unit of claim 1, wherein the control block identifies the signal as indicating no available service when the current context is a pending request for service.

4. The XDSL transceiver unit of claim 1, wherein the control block identifies the signal as indicating an opportunity for digital transmission when the current context is a digital on-hook condition.

5. The XDSL transceiver unit of claim 1, wherein the signal is an in-band 300 kHz sine tone transmitted by the loop termination point.

6. A method of operation for a remote digital subscriber line (XDSL) transceiver unit, comprising:

providing a first state corresponding to a digital on-hook condition;

providing a second state corresponding to a pending request for service to a loop termination point;

providing a third state corresponding to a digital off-hook condition;

responding to a busy signal, when in the second state, by moving to the first state;

responding to a grant signal, when in the second state, by moving to the third state; and training and establishing an XDSL physical layer after moving to the third state.

7. The method of claim 6, further comprising, after training and establishing the XDSL physical layer, storing profile information for the XDSL physical layer to use for future re-establishing of the XDSL physical layer.

8. The method of claim 6, further comprising, when the XDSL physical layer is to be dropped, negotiating the dropping of the XDSL physical layer with the loop termination point.

9. The method of claim 6, wherein the busy signal is an in-band 300 kHz sine tone transmitted by the loop termination point.

* * * * *